US012608487B1

(12) United States Patent
Babayoff et al.

(10) Patent No.: US 12,608,487 B1
(45) Date of Patent: Apr. 21, 2026

(54) CYBERSECURITY SCANNING TECHNIQUES

(71) Applicant: Cyera, Ltd., Tel Aviv (IL)

(72) Inventors: Roee Babayoff, Tel Aviv (IL); Yuval Lavie, Tel Aviv (IL); Tomer Avisar, Rishon LeTsiyon (IL); Gal Pollak, Tel Aviv (IL); Yotam Segev, New York, NY (US); Itamar Bar-Ilan, New York, NY (US); Yonatan Itai, Tel Aviv (IL); Lior Glazer, Tel Aviv (IL)

(73) Assignee: Cyera, Ltd., Tel Aviv (IL)

( * ) Notice: Subject to any disclaimer, the term of this patent is extended or adjusted under 35 U.S.C. 154(b) by 0 days.

(21) Appl. No.: 19/068,510

(22) Filed: Mar. 3, 2025

(51) Int. Cl.
*G06F 21/57* (2013.01)
*G06F 11/1446* (2026.01)
*G06F 21/62* (2013.01)

(52) U.S. Cl.
CPC ........ *G06F 21/577* (2013.01); *G06F 11/1469* (2013.01); *G06F 21/6245* (2013.01)

(58) Field of Classification Search
None
See application file for complete search history.

(56) References Cited

U.S. PATENT DOCUMENTS

| | | | |
|---|---|---|---|
| 7,577,807 B2 | 8/2009 | Rowan et al. | |
| 7,617,414 B2 | 11/2009 | Becker et al. | |
| 9,069,983 B1 * | 6/2015 | Nijjar | G06F 21/6218 |
| 9,116,847 B2 | 8/2015 | Liu et al. | |
| 9,632,874 B2 | 4/2017 | Pawar et al. | |
| 9,753,812 B2 | 9/2017 | Pawar et al. | |
| 10,223,365 B2 | 3/2019 | Kottomtharayil et al. | |
| 10,417,027 B1 | 9/2019 | Earl et al. | |
| 10,628,270 B1 | 4/2020 | Bajaj et al. | |
| 10,911,540 B1 | 2/2021 | Gunasekaran et al. | |
| 10,963,349 B2 | 3/2021 | Dhamdhere et al. | |
| 11,199,985 B2 | 12/2021 | Aldred et al. | |
| 11,216,563 B1 * | 1/2022 | Veselov | H04L 63/1408 |
| 11,921,671 B2 | 3/2024 | Komatsu et al. | |
| 12,147,305 B2 | 11/2024 | Chakankar et al. | |
| 2006/0235892 A1 * | 10/2006 | Kalach | G06F 11/3485 |
| 2023/0153322 A1 | 5/2023 | Wong et al. | |
| 2024/0378117 A1 | 11/2024 | Pawar et al. | |

* cited by examiner

*Primary Examiner* — Benjamin E Lanier
*Assistant Examiner* — Felicia Farrow
(74) *Attorney, Agent, or Firm* — M&B IP Analysts, LLC

(57) ABSTRACT

A system and method for scanning. A method includes identifying an entity in a computing environment based on a scan of the computing environment, wherein the entity is defined with respect to a relationship between the entity and a storage volume in the computing environment; restoring a snapshot of the entity to a running volume by creating a volume based on the snapshot; analyzing data of the running volume in order to identify at least one database; and running each of the identified at least one database.

11 Claims, 5 Drawing Sheets

CYBERSECURITY SCANNING TECHNIQUES

TECHNICAL FIELD

The present disclosure relates generally to scanning for potential cybersecurity vulnerabilities, and more specifically to scanning databases (DBs).

BACKGROUND

Data security often involves scanning data in order to identify data that is incorrectly stored or otherwise stored in a manner which could expose the data to harmful activity. For example, data may be scanned in order to determine whether it has personally identifiable information (PII) which, if exposed during a breach, could leak information about customers or other individuals that might cause personal, financial, reputational, or other harm. Identifying data containing PII which is stored improperly such as in a location where the data is more exposed to potential threats can therefore play a significant role in securing against threat actors.

Accessing data for scanning can be difficult because the data may not always be conveniently tracked. That is, if the data cannot be readily found, that data may be missed during scanning. This can lead to failure to detect improper data storage, which in turn can leave sensitive data vulnerable to exploitation. Identifying places where data is stored can be a significant technical challenge, particularly when the operator of the computing environment where the data is stored does not track locations of data or does not keep accurate and up-to-date records of data storage.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for scanning. The method comprises: identifying an entity in a computing environment based on a scan of the computing environment, wherein the entity is defined with respect to a relationship between the entity and a storage volume in the computing environment; restoring a snapshot of the entity to a running volume by creating a volume based on the snapshot; analyzing data of the running volume in order to identify at least one database; and running each of the identified at least one database.

Certain embodiments disclosed herein also include a non-transitory computer-readable medium having stored thereon causing a processing circuitry to execute a process, the process comprising: identifying an entity in a computing environment based on a scan of the computing environment, wherein the entity is defined with respect to a relationship between the entity and a storage volume in the computing environment; restoring a snapshot of the entity to a running volume by creating a volume based on the snapshot; analyzing data of the running volume in order to identify at least one database; and running each of the identified at least one database.

Certain embodiments disclosed herein also include a system for scanning. The system comprises: a processing circuitry; and a memory, the memory containing instructions that, when executed by the processing circuitry, configure the system to: identify an entity in a computing environment based on a scan of the computing environment, wherein the entity is defined with respect to a relationship between the entity and a storage volume in the computing environment; restore a snapshot of the entity to a running volume by creating a volume based on the snapshot; analyze data of the running volume in order to identify at least one database; and run each of the identified at least one database.

Certain embodiments disclosed herein include a method, non-transitory computer-readable medium, or system as noted above or below, wherein running each database further comprises or the system is further configured to perform the following step or steps: mapping the database to at least one engine based on at least one file of the running volume, wherein the database is run based on the at least one engine to which the database is mapped.

Certain embodiments disclosed herein include a method, non-transitory computer-readable medium, or system as noted above or below, wherein running each database further comprises or the system is further configured to perform the following step or steps: determining at least one configuration for the database based on the at least one engine to which the database is mapped, wherein the at least one configuration has a plurality of configuration parameters, wherein the database is run based on the at least one configuration determined for the database.

Certain embodiments disclosed herein include a method, non-transitory computer-readable medium, or system as noted above or below, wherein running each database further comprises or the system is further configured to perform the following step or steps: determining a minimal configuration for the database based on the plurality of configuration parameters of the at least one configuration determined for the database, wherein the minimal configuration is at least one minimal configuration parameter selected from among the plurality of configuration parameters, wherein the database is run using the minimal configuration determined for the database.

Certain embodiments disclosed herein include a method, non-transitory computer-readable medium, or system as noted above or below, wherein the at least one minimal configuration parameter includes a primary file, wherein running each database further comprises or the system is further configured to perform the following step or steps: running the database during a first run using a first file as the primary file; determining that the first file is not the primary file; and modifying the at least one minimal configuration parameter to include a second file as the primary file when it is determined that the first file is not the primary file.

Certain embodiments disclosed herein include a method, non-transitory computer-readable medium, or system as noted above or below, wherein the scan is a first scan, wherein running each database further comprises or the system is further configured to perform the following step or steps: connecting a virtual machine to the running volume; and scanning the database via the virtual machine in a second scan.

Certain embodiments disclosed herein include a method, non-transitory computer-readable medium, or system as noted above or below, wherein running each database further comprises or the system is further configured to perform the following step or steps: launching the virtual machine based on at least one specification of the database, wherein the virtual machine is connected to the running volume when the virtual machine has been launched.

Certain embodiments disclosed herein include a method, non-transitory computer-readable medium, or system as noted above or below, wherein the entity is a first entity of a plurality of entities, wherein the storage volume is a first storage volume of a plurality of storage volumes, further including or being configured to perform the following step or steps: determining an entity type of each entity of the plurality of entities, wherein the entity type of each entity is determined based on a relationship between the entity and a respective storage volume of the plurality of storage volumes; grouping the plurality of entities into at least one group based on the entity type of each entity; and sampling from each of the at least one group, wherein the first entity is sampled from a first group of the plurality of groups.

Certain embodiments disclosed herein include a method, non-transitory computer-readable medium, or system as noted above or below, further including or being configured to perform the following step or steps: applying at least one policy with respect to the data of the running volume, wherein the at least one policy is defined at least with respect to data types; and performing at least one remediation action with respect to at least one portion of data among the data of the running volume which fails to comply with the at least one policy.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
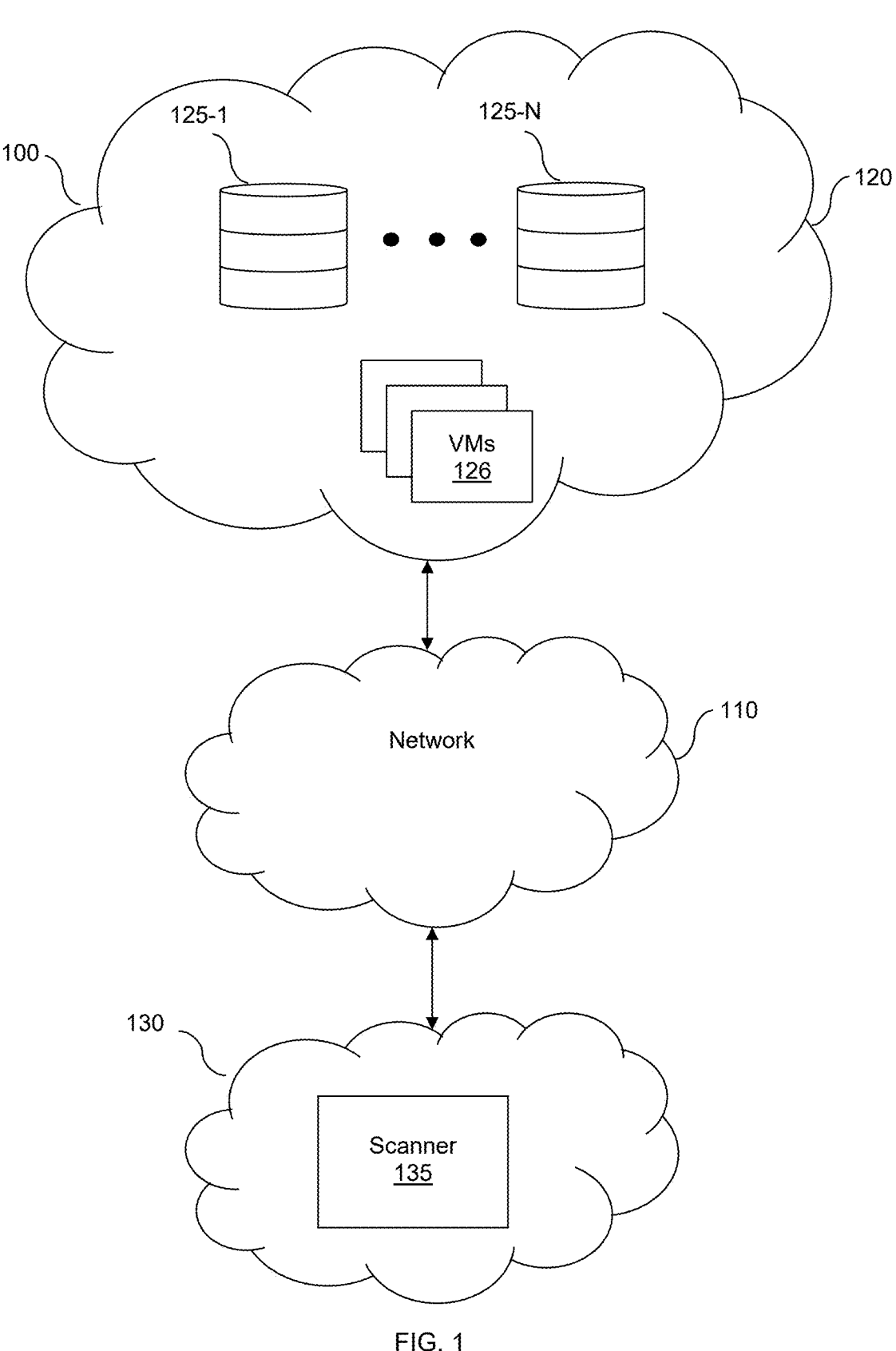
FIG. 1 is a network diagram utilized to describe various disclosed embodiments.

The various disclosed embodiments include techniques for scanning and, in particular, for scanning databases (DBs). The embodiments disclosed herein include techniques which allow for efficiently scanning virtual machines (VMs) and, in particular, VMs which may be deployed remotely from scanners that are performing the scanning. To this end, various disclosed embodiments provide techniques for identifying DBs to scan and for running DBs remotely from their original locations in order to enable remotely scanning the DBs. Further, such remote scanning of DBs may allow for performing scanning without disrupting normal operations of those DBs in their original locations or otherwise in the computing environments in which those DBs are deployed.

In an embodiment, a computing environment is scanned in order to identify entities defined with respect to their relationships with storage volumes or otherwise defined with respect to connections to or with storage volumes. Example entities defined with respect to storage volumes may be or may include, but are not limited to, virtual machines (for example, as identified with respect to a central processing unit connected to one or more volumes), detached volumes (for example, a volume which is not connected to any virtual machines), snapshots (for example, a snapshot of a volume which is no longer connected to a virtual machine but was previously). The types of the entities may be determined and utilized in order to scan for potential DBs within the volumes associated with those entities (for example, volumes included in or connected to the entities).

In an embodiment, snapshots are created for entities having potential DBs in order to allow for scanning their respective DBs remotely. The snapshots may be encrypted before being transferred to a remote computing environment such as a cloud computing environment in which the scanner is deployed. The snapshots are scanned in order to identify DBs. The identified DBs are run in order to enable scanning the contents of the DBs.

In some embodiments, in order to support running the DBs in remote environments which may not initially be configured to run the DBs, running each DB includes analyzing data related to the DB in order to determine configuration parameters used for running the DB. The configuration parameters may include, but are not limited to, engine, version of an engine, configuration of the engine, and the like. To this end, in an embodiment, one or more files of each volume are mapped to engines based on metadata of those files such as, but not limited to, file name, file extension, dynamic signatures (for example, signatures within headers of files), and the like.

In a further embodiment, a minimal configuration for running the DB using an engine is determined as a set of minimal configuration parameters, and the DB is run using the minimal configuration. Results of running the DB using the minimal configuration may be analyzed in order to identify one or more expected results which are missing in the results, and the configuration realized using the minimal configuration parameters is modified in order to produce a modified configuration including a modified set of configuration parameters. The DB may be run again using the modified set of configuration parameters.

When running the DBs in a given volume, a VM may be launched and connected to the volume in order to allow for scanning the DBs in the volume. The DBs may be scanned in order to identify types of data within the DBs. In some embodiments, remediation actions may be performed in order to remediate violations of data storage policies or otherwise to proactively remediate potential vulnerabilities for the DBs.

The disclosed embodiments allow for remotely scanning DBs while minimizing disruption to the DBs in their original computing environments. Moreover, various disclosed embodiments allow for prioritizing and selecting entities for scanning which may be utilized to improve efficiency of the scanning such that the scanning may be performed using fewer computing resources (for example, by scanning less total data), faster, using less memory (for example, by creating snapshots for only some DBs), using fewer networking resources (for example, by reducing the number of snapshots to be transferred), and the like.

In particular, some embodiments utilize similarity algorithms in order to identify similar entities and to group similar entities together. More specifically, similarity may be determined for pairs of entities based on factors which may be indicated in metadata of those entities such as, but not limited to, location of creation, usage (for example, how each entity is used), whether the entity uses open source code, whether the entities have the same role in a software development pipeline, size, combinations thereof, and the like. Entities may be sampled from among each group of similar entities, and snapshots may be created and transferred for scanning for the sampled entities. Grouping similar entities in this manner therefore allows for reducing redundant scanning, thereby conserving computing resources.

FIG. 1 shows an example network diagram 100 utilized to describe the various disclosed embodiments. In the example network diagram 100, a first computing environment 120 and a second computing environment 130 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The first computing environment 120 includes disks 125-1 through 125-N, where N is an integer having a value of 1 or greater (hereinafter referred to individually as a disk 125 and collectively as disks 125). The disks 125 may contain one or more databases (DBs, not shown) which, in accordance with various disclosed embodiments, may be desired to scan. The disks 125 may be or may include physical disks, virtual disks, or both.

In particular, the DBs may be utilized by one or more virtual machines (VMs) 126 for activities performed by the VMs 126. The DBs in the disks 125 may run on top of any or all of the VMs 126. To this end, the VMs 126 may be mounted, attached, or otherwise connected to the disks 125 in order to enable the VMs 126 to access DBs stored in the disks 125 for use in performing activities of the VMs 126.

The second computing environment 130 includes a scanner 135 which is configured to scan and, in particular, scan DBs among the disks 125 as discussed herein. The scanner 135 may be configured to identify DBs running on the VMs 126 and to scan those DBs in order to secure the computing environment 120, for example, by identifying sensitive data and enforcing policies with respect to the potentially sensitive data.

To this end, the scanner 135 may be configured to create snapshots of data stored in the disks 125 and to import those snapshots to the computing environment 130 for scanning. Moreover, the scanner 135 may be configured to restore each snapshot to a running volume (not shown) in order to enable scanning for potential databases and running those databases. Such importing may therefore enable remotely scanning DBs by the scanner 135, and in particular may allow for scanning running versions of those DBs without disrupting normal operations of the DBs within the computing environment 120.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

6

Figure 2:
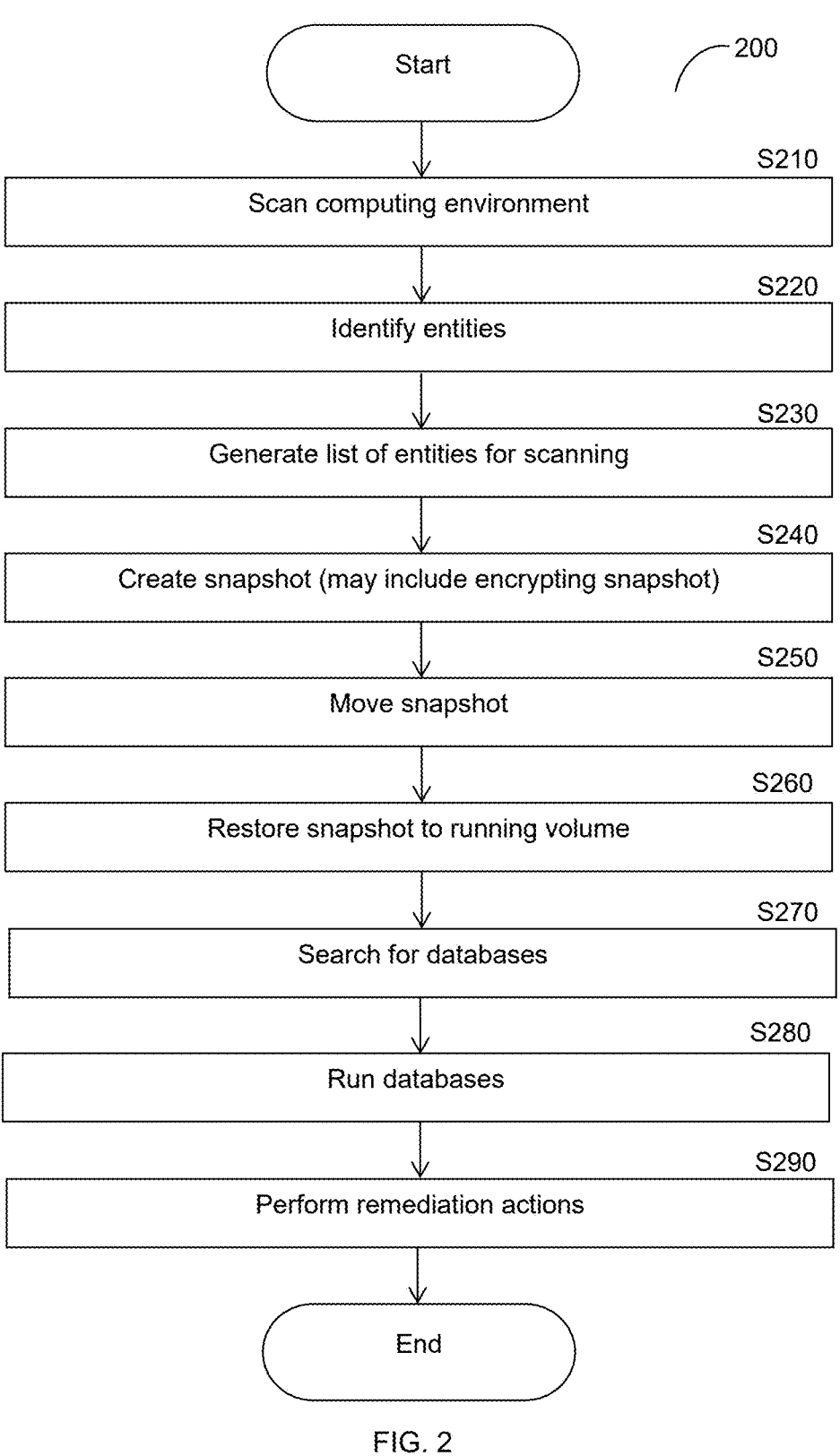
FIG. 2 is a flowchart illustrating a method for scanning according to an embodiment.

FIG. 2 is a flowchart 200 illustrating a method for scanning according to an embodiment. In an embodiment, the method is performed by the scanner 135, FIG. 1.

At S210, an initial scan is performed with respect to a computing environment which may contain databases (DBs) to be scanned further. In an embodiment, the initial scan includes scanning the computing environment for potential entities which may be defined with respect to volumes such as, but not limited to, virtual machines (for example, virtual machines connected to volumes), volumes, and snapshots (for example, snapshots of volumes). The initial scan may be performed using a set of initial scanning rules that define predetermined types of entities of interest for further scanning as well as criteria for identifying those entities. To this end, the initial scanning rules may define criteria for identifying volumes (for example, identifying the volumes themselves or identifying volumes within snapshots).

In an embodiment, the initial scan is a light scan designed to avoid interruption of service to activities within the computing environment. Such a light scan may utilize metadata in order to identify potential entities and may yield metadata related to entity activity used to prioritize, select, or otherwise determine which entities to scan further. Such metadata related to entity activity may indicate, but is not limited to, open ports, common databases, creation time, size, combinations thereof, and the like. In a further embodiment, the initial scan avoids scanning data within volumes of entities.

At S220, one or more entities are identified. The entities may be or may include, but are not limited to, virtual machines (for example, as identified with respect to a central processing unit connected to one or more volumes), detached volumes (for example, a volume which is not connected to any virtual machines), snapshots (for example, a snapshot of a volume which is no longer connected to a virtual machine but was previously).

In an embodiment, identifying the entities includes classifying the entities into different predetermined entity type classifications. In a further embodiment, entities are classified into entity type classifications such as virtual machines, detached volumes, and snapshots. In yet a further embodiment, entities which do are not classified into any known entity type classifications may be classified into an unknown or null classification.

The entity type classifications may be utilized during subsequent scanning, for example, in order to determine how to run DBs related to each entity such as by determining configurations and engines to utilize for running those DBs based on entity type. To this end, in an embodiment, identifying the entities includes applying entity classification rules or an entity classifying machine learning model that is trained to classify entities based on historical initial scanning data.

At S230, a list of entities to be scanned for potential DBs is generated. In an embodiment, the list of entities includes entities which are identified as potentially having DBs to scan. Such entities may be identified based on volumes in a computing environment. As noted above, each entity may be classified or otherwise defined with respect to its relationship to one or more volumes. The list of entities to be scanned may be or may include entities having certain entity type classifications. In an embodiment, entities having entity type classifications of virtual machines, detached volumes, or snapshots may be selected to be included among the list of entities to be scanned for potential DBs.

In an embodiment, generating the list of entities to be scanned may include, but is not limited to, grouping entities based on similarity, sampling entities, ranking entities, filtering entities, combinations thereof, and the like. An example process which may be used to generate the list of entities is described further below with respect to FIG. 3.

At S240, one or more snapshots are created for each entity to be scanned. Each snapshot is a record of contents of a volume at a point in time (i.e., at the point of time of snapshot creation). Accordingly, each snapshot at least includes contents of one or disks of a given volume related to the entity. To this end, in an embodiment, each snapshot is a copy of a volume of an entity (for example, a volume attached to a VM when the entity is a VM, the entity itself when the entity is a detached volume, or a volume represented by the entity when the entity is a snapshot) including one or more disks. In a further embodiment, each snapshot includes copies of one or more disks of the volume. In yet a further embodiment, each snapshot includes a full, read-only copy of one or more virtual hard disks.

The snapshots contain contents of disk of the entities and may therefore be used to scan the disks further while minimizing disruption to service. That is, the snapshots may be scanned further instead of the original volumes or portions thereof in order to avoid scanning those original volumes or disks in their computing environment of origin, thereby avoiding interference with activities which use those volumes or disks within that computing environment. The snapshots may be imported or otherwise moved from a first computing environment containing the original volumes or disks to a second computing environment, where the second computing environment includes the scanner which will scan the snapshots or otherwise is the location where the snapshots will be scanned.

In an embodiment, creating each snapshot further includes encrypting the snapshot for subsequent use. Encrypting the snapshots may be used in order to prevent or otherwise avoid the contents of the snapshot from being intercepted in transit while the snapshots are being imported or moved.

At S250, the snapshots are imported or otherwise moved to a computing environment in which the snapshots are to be scanned. As a non-limiting example, the snapshot may be moved from a customer's computing environment to a computing environment in which a scanner (for example, the scanner 135) is deployed or otherwise a computing environment accessible to the scanner in order to enable the scanner to scan the snapshot.

At S260, the snapshot is restored to a running volume. In an embodiment, restoring the snapshot includes creating a volume based on the snapshot, which allows for making a copy of the volume which can be run in order to scan DBs of the volume. In a further embodiment, the volume created based on the snapshot is mounted to a drive in order to allow the volume to be run.

At S270, databases (DBs) are searched for among the running volume. In an embodiment, searching for the DBs includes analyzing the data of the running volume for predetermined patterns associated with DBs. More specifically, the patterns may be defined with respect to metadata of files or otherwise with respect to factors related to files. Such metadata of files may be or may include, but is not limited to, file names, filename extensions, and the like. To this end, the data may be analyzed with respect to files represented in the volume based on factors such as, but not limited to, file size, file path, time of modification (for example modification data), prefix, filesystem type, combinations thereof, and the like. In this regard, it is noted that DBs tend to consistently demonstrate certain patterns with respect to filenames such that these patterns can be identified in order to identify DBs of running volumes.

At S280, the DBs found during the search at S270 are run. In an embodiment, running each DB includes connecting a VM to a volume containing the DB and scanning the DB via the connected volume. In a further embodiment, running at least some of the DBs may include launching a VM and connecting the launched VM to the DB. An example process for running DBs is described further below with respect to FIG. 4.

At S290, one or more remediation actions are performed based on results of running the DBs. In an embodiment, performing the remediation actions includes applying one or more policies defined with respect to data types which may be included among the results of running the DBs. Such remediation actions may define permitted conditions for storing data having different data types, forbidden conditions for storing data having different data types, both, and the like. In a further embodiment, one or more remediation actions may be performed with respect to any data which fails to comply with such policies (for example, data which do not meet the permitted conditions or which meet the forbidden conditions). The remediation actions may include, but are not limited to, generating a notification (for example, a notification indicating that the data should be secured), preventing access to the data which does not comply with one or more policies, preventing communications between a system storing such data and other systems, combinations thereof, and the like.

Figure 3:
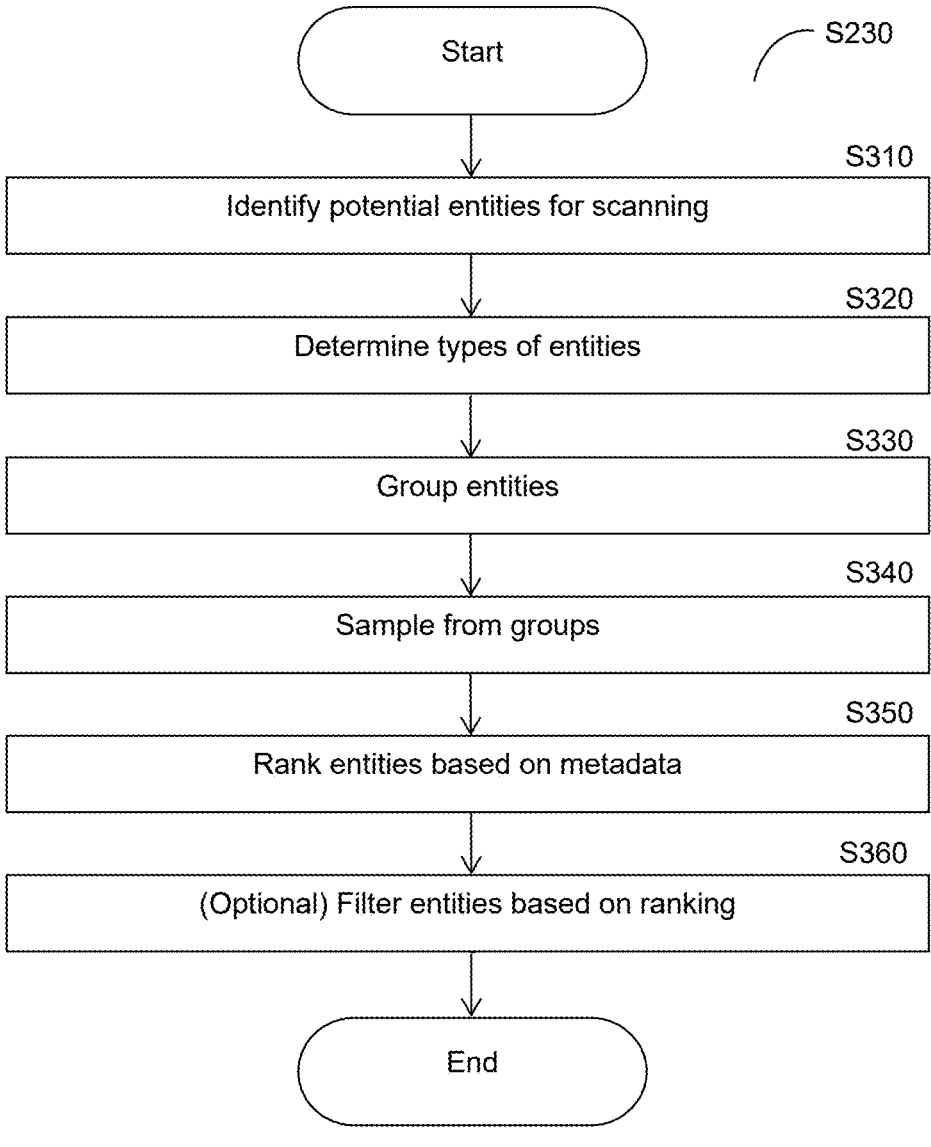
FIG. 3 is a flowchart illustrating a method for generating a list of entities to scan according to an embodiment.

FIG. 3 is a flowchart S230 illustrating a method for generating a list of entities to scan according to an embodiment.

At S310, potential entities for scanning are identified. As noted above, in an embodiment, the potential entities are entities related to volumes such as, but not limited to, virtual machines connected to volumes, detached volumes, snapshots of volumes, combinations thereof, and the like. To this end, in a further embodiment, the potential entities for scanning may be a set of entities among a list of entities found by scanning a computing environment as discussed above with respect to FIG. 2.

At S320, a type of each entity is determined. In an embodiment, the type of each entity is determined based on a classification of the entity. As noted above, in an embodiment, the entities are classified into different predetermined entity type classifications. In a further embodiment, entities are classified into entity type classifications such as virtual machines, detached volumes, and snapshots. In yet a further embodiment, entities which do are not classified into any known entity type classifications may be classified into an unknown or null classification. To this end, in a further embodiment, the entity type for each entity is any of virtual machine, detached volume, snapshot, or unknown.

At S330, the entities are grouped into one or more groups of entities. In an embodiment, the entities are grouped based on metadata of the entities. In a further embodiment, the entities may be grouped based further on their entity types.

In an embodiment, the entities are grouped based on similarity. To this end, in a further embodiment, grouping the entities includes applying one or more similarity algorithms in order to identify similar entities, where similar entities are grouped into the same group of entities. More specifically, pairs of entities may be identified, and similarity may be determined for the pairs of entities based on factors which may be indicated in metadata of those entities such as, but not limited to, location of creation, usage (for example, how each entity is used), whether the entity uses open source code, whether the entities have the same role in a software development pipeline, size, combinations thereof, and the like. Grouping similar entities in this manner therefore allows for reducing redundant scanning, thereby conserving computing resources.

At S340, the entities are sampled. In an embodiment, entities are sampled from among each group of entities. The entities may be sampled, for example but not limited to, randomly by selecting a certain number or proportion of entities from each group to be the samples from that group.

At S350, the entities are ranked based on their respective metadata. When the entities are grouped and sampled as discussed with respect to S340 and S350, the entities which are ranked may be the entities sampled from among the groups. In an embodiment, the entities are ranked based on metadata related to entity activity such as, but not limited to, open ports, common databases, creation time, size, combinations thereof, and the like. In a further embodiment, ranking the entities includes applying a ranking machine learning model trained to rank entities based on historical sets of entity activity metadata. Alternatively, a set of entity ranking rules may be applied based on the metadata. Such entity ranking rules may define scoring for different portions of metadata, combinations of metadata, both, and the like.

At optional S360, the entities may be filtered based on the ranking. In an embodiment, only a certain number of entities (for example, a predetermined number) may be utilized during subsequent processing. To that end, in a further embodiment, that number of entities which have the highest rankings among all ranked entities may be selected for subsequent processing, and all other entities having lower rankings are filtered out.

Figure 4:
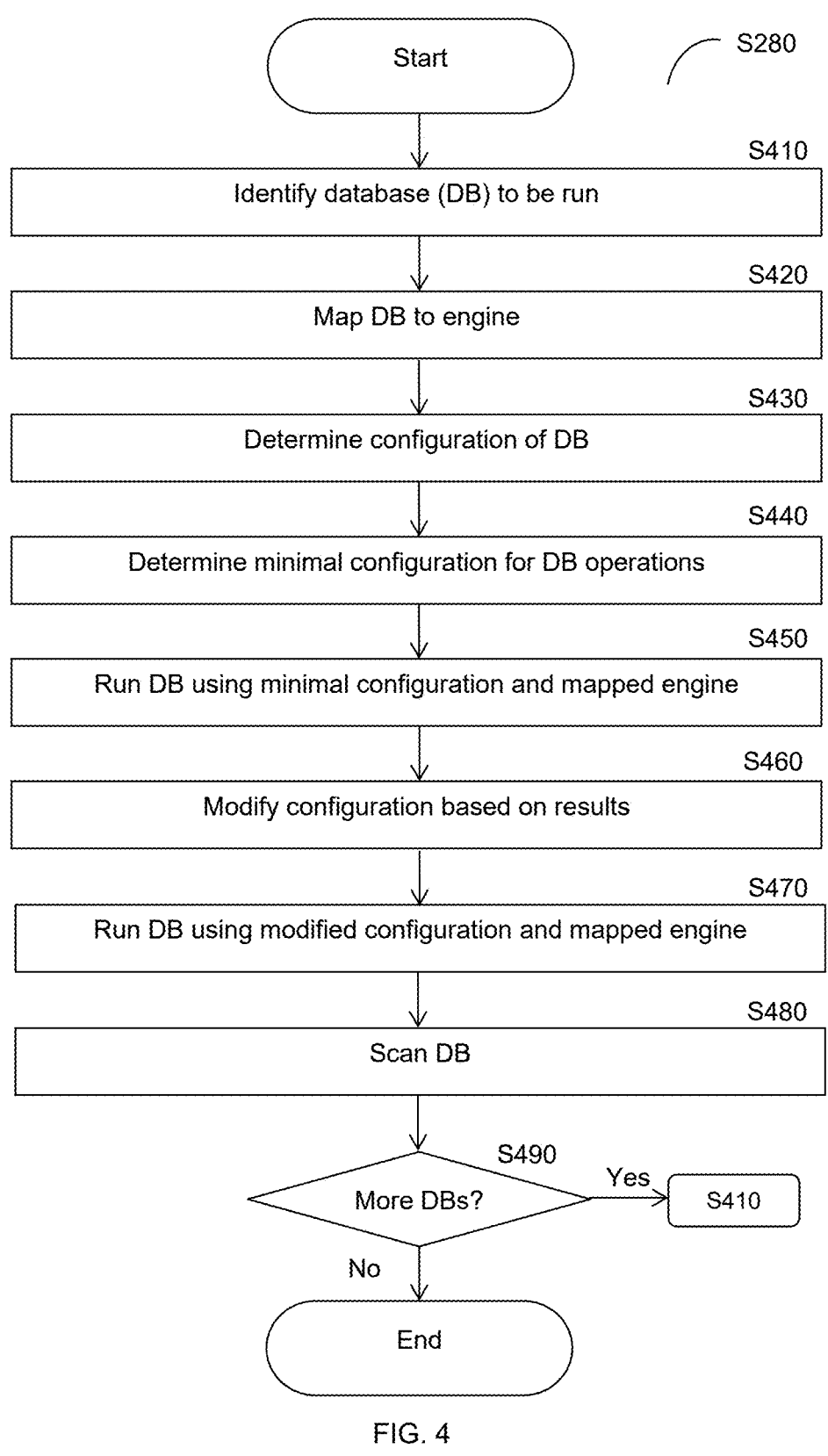
FIG. 4 is a flowchart illustrating a method for running databases according to an embodiment.

FIG. 4 is a flowchart S280 illustrating a method for running databases according to an embodiment.

At S410, a database (DB) to be run is identified. The identified DB may be associated with one or more volumes. In an embodiment, each volume is or includes one or more disks which may be or may include physical disks, virtual disks, and the like. In embodiments where the DB is used for VM operations, each volume may be a virtual volume including one or more VM files and one or more virtual disks. The DBs associated with a given volume may be DBs stored on the disks of that volume.

In this regard, it is noted that DBs may run on top of VMs or otherwise be used by VMs connected to volumes containing those DBs in order to perform activities by the VMs. Scanning the DBs may prove challenging for systems other than the VM on which a given DB runs. Scanners may lack access to the VMs running DBs or otherwise may be unable to control DBs running on VMs. For example, VMs may lack any application programming interface (API) which would allow for convenient tracking which DBs are running.

At S420, the DB is mapped to an engine. In an embodiment, mapping the DB to the engine includes mapping one or more files of volumes associated with the DB based on metadata of those files. Such file metadata may include, but is not limited to, file name, file extension, dynamic signatures (for example, signatures within headers of files), and the like. To this end, in a further embodiment, S420 may include applying one or more engine mapping rules. Such engine mapping rules may define metadata or combinations of metadata corresponding to predetermined engines. As a non-limiting example, engines known to operate on files having certain metadata may be associated with that metadata in the engine mapping rules such that files having that metadata are mapped to those engines. The DB may be mapped to an engine that is configured to run the DB correctly when the DB is configured correctly such that the mapped engine may be used to run the DB in order to scan contents of the DB as discussed herein.

In some embodiments, the file metadata used to map the DB to the engine includes dynamic signatures only when one or more dynamic signature usage conditions are met. Such dynamic signature usage conditions may include, but are not limited to, file change frequency above a predetermined threshold. That is, dynamic signatures may be considered during the mapping only when files of the DB are changed frequently.

The engine that the database is mapped to may be defined with respect to a particular version of an engine, for example, with respect to major version, minor version, or both. In some embodiments, the DB is mapped to an engine based further on assets which are logically located near the DB (for example, as defined with respect to logical locations of the DB and the assets relative to each other in storage). To this end, the engine mapping rules may further indicate assets commonly used by certain versions of engines.

At S430, a configuration of the DB is determined based on the mapping of the DB to the engine. In an embodiment, the configuration of the DB is determined at least with respect to configuration parameters used for running the DB such as, but not limited to, engine, version of an engine, configuration of the engine, and the like. The configuration parameters may be a predetermined set of configuration parameters which are known to be commonly used by that engine in order to run DBs.

In some embodiments, multiple potential configurations of the DB may be determined. As a non-limiting example, when multiple potential versions of the DB are identified, each version may utilize a different configuration. In such embodiments, these different potential configurations may be analyzed collectively to determine a minimal configuration at S440.

At S440, a minimal configuration for DB operations of the DB is determined based on the configuration parameters. In an embodiment, the minimal configuration for the DB is a minimal set of configuration parameters including the least amount of configuration parameters among configuration parameters which may be used by the engine in order to run DBs. The minimal set of configuration parameters may be selected from among the configuration parameters of the engine using a set of minimal configuration parameter selection rules which may define, for example, predetermined sets of configuration parameters which are commonly used for running DBs in basic configurations with fewer configuration parameters.

Configuration parameters which may be among the set of minimal configuration parameters may include, but are not limited to, primary file, login credentials, and the like. To this end, in a further embodiment, the minimal set of configuration parameters includes a selection of one of the files of the DB to be used as a primary file. As discussed further below, the DB may be run assuming that a certain file is primary, and the engine may return an indication of whether the file is actually the primary file. When the file is not the primary file, the configuration parameters may be modified to select another file as the primary file and the engine may be run again. That is, it may be determined based on the outputs of the engine, that a first file is not the primary file, and the minimal configuration parameters may be modified such that a second file is used as the primary file instead when it is determined that the first file is not the primary file.

As noted above, in some embodiments, multiple potential configurations of the DB may be determined. In a further embodiment, the minimal configuration is determined based on the multiple potential configurations for the DB. More specifically, in such an embodiment, a minimal configuration includes configuration parameters which are common to the different potential configurations. That is, the minimal configuration includes a set of common configuration parameters of the multiple potential configurations such that each common configuration parameter is a parameter which is determined based on each of the multiple potential configurations of the DB. In some further embodiments, the set of minimal configuration parameters of the minimal configuration is the set of common configuration parameters among the multiple potential configurations of the DB.

In some embodiments, only a portion of files of the DB may be loaded for scanning. As a non-limiting example, loading of files identified as being corrupted or as not to be scanned may be avoided. In such an embodiment, only that portion of the DB files may be mounted to a VM for scanning. To this end, in such an embodiment, the minimal configuration may be further determined based on the portion of files to be loaded and not based on any files which will not be loaded. That is, in such an embodiment, the minimal configuration may be determined in order to scan only the files which will be mounted to the VM and not all files in the DB.

At S450, the DB is run using the determined minimal configuration via the engine mapped to the DB. In an embodiment, running the DB includes connecting a VM to a volume containing the DB and scanning the DB via the connected volume. In a further embodiment, running the DB further includes launching a VM and connecting the launched VM to the DB. In yet a further embodiment, the VM is launched based on specifications of the DB (for example, size of the database). As a non-limiting example, a size of the VM to be launched may be selected based on a size of the DB. That is, in such an example, a larger DB would result in launching a larger VM.

At S460, based on results of running the DB using the minimal configuration and the engine, a configuration of the DB is modified. In an embodiment, modifying the configuration of the DB includes analyzing results of running the DB using the minimal configuration and comparing such results to one or more expected results in order to determine a set of modified configuration parameters. When at least a portion of the expected results are not present in the results of running the DB using the minimal configuration, the configuration may be modified into a modified configuration in order to realize a configuration that is more likely to provide the expected results.

To this end, in an embodiment, S460 may include applying a set of configuration modification rules defined with respect to unexpected results which are missing from a set of expected results. As a non-limiting example, such configuration modification rules may define specific configuration parameters to use as modified configuration parameters or otherwise define how to modify a set of configuration parameters based on which expected results are missing from among a set of results.

At S470, the DB is run using the modified configuration via the engine mapped to the DB.

It should be noted that only a single instance of configuration modification is discussed with respect to FIG. 4 for simplicity, but that the configuration may be modified multiple times without departing from the scope of the disclosure. For example, a DB may be iteratively run using different configurations until all expected results are achieved at a given iteration.

At S480, the running DB is scanned. Scanning the database may include, but is not limited to, analyzing data such as data in tables, columns, and the like. In some implementations, the data may be analyzed in order to classify the data into data types, where the data types may be used to enforce policies. As a non-limiting example, such a policy may define certain types of data as not being permitted to be stored within the same database or table, or may forbid certain types of data from being stored in certain locations in storage. Classifying the data may further include applying classification rules, a classifier machine learning model trained to classify data into data types, and the like.

At S480, it is checked if there are more DBs to be scanned and, if so, execution continues with S410; otherwise, execution terminates.

Figure 5:
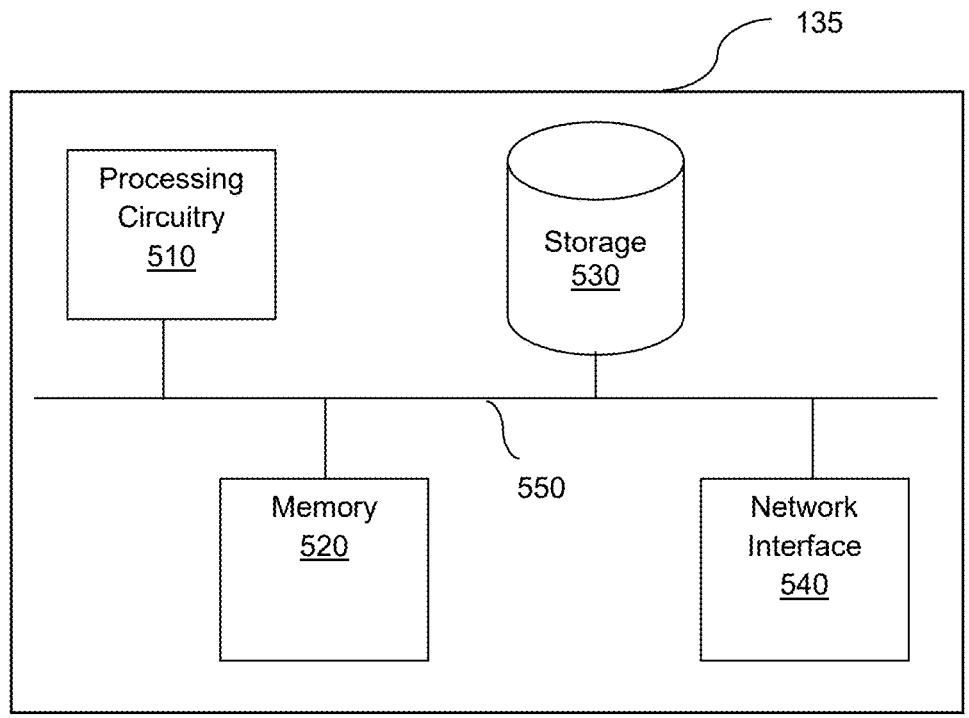
FIG. 5 is a schematic diagram of a scanner according to an embodiment.

FIG. 5 is an example schematic diagram of a scanner 135 according to an embodiment. The scanner 135 includes a processing circuitry 510 coupled to a memory 520, a storage 530, and a network interface 540. In an embodiment, the components of the scanner 135 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the scanner 135 to communicate with other systems, devices, components, applications, or other hardware or software components, for example as described herein.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for scanning, comprising:

identifying an entity in a computing environment based on a scan of the computing environment, wherein the entity is defined with respect to a relationship between the entity and a storage volume in the computing environment;

restoring a snapshot of the entity to a running volume by creating a volume based on the snapshot;

analyzing data of the running volume in order to identify at least one database; and running each of the identified at least one database, wherein running each database further comprises mapping the database to at least one engine based on at least one file of the running volume, wherein the database is run based on the at least one engine to which the database is mapped, wherein running each database further comprises:

determining at least one configuration for the database based on the at least one engine to which the database is mapped, wherein the at least one configuration has a plurality of configuration parameters, wherein the database is run based on the at least one configuration determined for the database;

determining a minimal configuration for the database based on the plurality of configuration parameters of the at least one configuration determined for the database, wherein the minimal configuration is at least one minimal configuration parameter selected from among the plurality of configuration parameters, wherein the database is run using the minimal configuration determined for the database, wherein the at least one minimal configuration parameter includes a primary file;

running the database during a first run using a first file as the primary file;

determining that the first file is not the primary file; and modifying the at least one minimal configuration parameter to include a second file as the primary file when it is determined that the first file is not the primary file.

2. The method of claim 1, wherein the scan is a first scan, wherein running each database further comprises:

connecting a virtual machine to the running volume; and scanning the database via the virtual machine in a second scan.

3. The method of claim 2, wherein running each database further comprises:

launching the virtual machine based on at least one specification of the database, wherein the virtual machine is connected to the running volume when the virtual machine has been launched.

4. The method of claim 1, wherein the entity is a first entity of a plurality of entities, wherein the storage volume is a first storage volume of a plurality of storage volumes, further comprising:

determining an entity type of each entity of the plurality of entities, wherein the entity type of each entity is determined based on a relationship between the entity and a respective storage volume of the plurality of storage volumes;

grouping the plurality of entities into at least one group based on the entity type of each entity; and sampling from each of the at least one group, wherein the first entity is sampled from a first group of the plurality of groups.

5. The method of claim 1, further comprising:

applying at least one policy with respect to the data of the running volume, wherein the at least one policy is defined at least with respect to data types; and performing at least one remediation action with respect to at least one portion of data among the data of the running volume which fails to comply with the at least one policy.

6. A non-transitory computer-readable medium having stored thereon instructions for causing a processing circuitry to execute a process, the process comprising:

identifying an entity in a computing environment based on a scan of the computing environment, wherein the entity is defined with respect to a relationship between the entity and a storage volume in the computing environment;

restoring a snapshot of the entity to a running volume by creating a volume based on the snapshot;

analyzing data of the running volume in order to identify at least one database; and running each of the identified at least one database, wherein running each database further comprises mapping the database to at least one engine based on at least one file of the running volume, wherein the database is run based on the at least one engine to which the database is mapped, wherein running each database further comprises:

determining at least one configuration for the database based on the at least one engine to which the database is mapped, wherein the at least one configuration has a plurality of configuration parameters, wherein the database is run based on the at least one configuration determined for the database;

determining a minimal configuration for the database based on the plurality of configuration parameters of the at least one configuration determined for the database, wherein the minimal configuration is at least one minimal configuration parameter selected from among the plurality of configuration parameters, wherein the database is run using the minimal configuration determined for the database, wherein the at least one minimal configuration parameter includes a primary file;

running the database during a first run using a first file as the primary file;

determining that the first file is not the primary file; and modifying the at least one minimal configuration parameter to include a second file as the primary file when it is determined that the first file is not the primary file.

7. A system for scanning, comprising:

a processing circuitry; and a memory, the memory containing instructions that, when executed by the processing circuitry, configure the system to:

identify an entity in a computing environment based on a scan of the computing environment, wherein the entity is defined with respect to a relationship between the entity and a storage volume in the computing environment;

restore a snapshot of the entity to a running volume by creating a volume based on the snapshot;

analyze data of the running volume in order to identify at least one database; and running each of the identified at least one database, wherein running each database further comprises mapping the database to at least one engine based on at least one file of the running volume, wherein the database is run based on the at least one engine to which the database is mapped, wherein the system is further configured to:

determine at least one configuration for the database based on the at least one engine to which the database is mapped, wherein the at least one configuration has a plurality of configuration parameters, wherein the database is run based on the at least one configuration determined for the database;

determine a minimal configuration for the database based on the plurality of configuration parameters of the at least one configuration determined for the database, wherein the minimal configuration is at least one minimal configuration parameter selected from among the plurality of configuration parameters, wherein the database is run using the minimal configuration determined for the database, wherein the at least one minimal configuration parameter includes a primary file;

run the database during a first run using a first file as the primary file;

determine that the first file is not the primary file; and modify the at least one minimal configuration parameter to include a second file as the primary file when it is determined that the first file is not the primary file.

8. The system of claim 7, wherein the scan is a first scan, wherein the system is further configured to, for each database which is run:

connect a virtual machine to the running volume; and scan the database via the virtual machine in a second scan.

9. The system of claim 8, wherein the system is further configured to, for each database which is run:

launch the virtual machine based on at least one specification of the database, wherein the virtual machine is connected to the running volume when the virtual machine has been launched.

10. The system of claim 7, wherein the entity is a first entity of a plurality of entities, wherein the storage volume is a first storage volume of a plurality of storage volumes, wherein the system is further configured to:

determine an entity type of each entity of the plurality of entities, wherein the entity type of each entity is determined based on a relationship between the entity and a respective storage volume of the plurality of storage volumes;

group the plurality of entities into at least one group based on the entity type of each entity; and sample from each of the at least one group, wherein the first entity is sampled from a first group of the plurality of groups.

11. The system of claim 7, wherein the system is further configured to:

apply at least one policy with respect to the data of the running volume, wherein the at least one policy is defined at least with respect to data types; and perform at least one remediation action with respect to at least one portion of data among the data of the running volume which fails to comply with the at least one policy.

* * * * *